(12) United States Patent
Yamada

(10) Patent No.: US 9,871,609 B2
(45) Date of Patent: Jan. 16, 2018

(54) NETWORK SYSTEM, TIME MASTER STATION, AND TIME SLAVE STATION

(71) Applicant: Mitsubishi Electric Corporation, Tokyo (JP)

(72) Inventor: Atsushi Yamada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/502,893

(22) PCT Filed: Jul. 8, 2015

(86) PCT No.: PCT/JP2015/069690
§ 371 (c)(1),
(2) Date: Feb. 9, 2017

(87) PCT Pub. No.: WO2017/006469
PCT Pub. Date: Jan. 12, 2017

(65) Prior Publication Data
US 2017/0230126 A1 Aug. 10, 2017

(51) Int. Cl.
*G06F 15/16* (2006.01)
*H04J 3/06* (2006.01)
(52) U.S. Cl.
CPC .......... *H04J 3/0644* (2013.01); *H04J 3/0676* (2013.01)
(58) Field of Classification Search
CPC .............................. H04J 3/0644; H04J 3/0676
See application file for complete search history.

(56) References Cited

U.S. PATENT DOCUMENTS

| 6,698,022 | B1 | 2/2004 | Wu |
| 7,356,617 | B2 | 4/2008 | Suzuki et al. |
| 8,281,177 | B2 | 10/2012 | Yajima et al. |
| 8,558,657 | B2 | 10/2013 | Moriya et al. |

(Continued)

FOREIGN PATENT DOCUMENTS

| JP | 11-282812 A | 10/1999 |
| JP | 2001-236134 A | 8/2001 |

(Continued)

OTHER PUBLICATIONS

Communication dated Jun. 6, 2017 from the Taiwanese Intellectual Property Office in counterpart application No. 105121202.

(Continued)

*Primary Examiner* — John B Walsh
(74) *Attorney, Agent, or Firm* — Sughrue Mion, PLLC; Richard C. Turner

(57) ABSTRACT

A network system includes a synchronous master device to output a cooperative-operation timing signal in a cooperative-operation cycle, a time master station connected to a network, and a time slave station connected to the network. The time master station includes a master clock to count a time, and a master generation unit to generate master cooperative-operation-time information on the basis of the cooperative-operation timing signal and the time counted by the master clock. The time slave station includes a slave clock to count a time, and a slave generation unit to generate slave cooperative-operation-time information on the basis of the master cooperative-operation-time information and the time counted by the slave clock.

9 Claims, 7 Drawing Sheets

(56) References Cited

U.S. PATENT DOCUMENTS

| | | |
|---|---|---|
| 9,264,213 B2 | 2/2016 | Kozaki et al. |
| 2004/0109474 A1 | 6/2004 | Koshino et al. |
| 2013/0266306 A1 | 10/2013 | Kozaki et al. |
| 2014/0169792 A1 | 6/2014 | Lee et al. |
| 2015/0071309 A1* | 3/2015 | Aweya ................. H04J 3/0682 370/503 |
| 2015/0085852 A1* | 3/2015 | Mizutani ............. H04L 43/0858 370/350 |

FOREIGN PATENT DOCUMENTS

| | | |
|---|---|---|
| JP | 2001-237813 A | 8/2001 |
| JP | 2002-164872 A | 6/2002 |
| JP | 2003-271208 A | 9/2003 |
| JP | 2004-186877 A | 7/2004 |
| JP | 2007-101306 A | 4/2007 |
| JP | 2007-184687 A | 7/2007 |
| JP | 2007-213474 A | 8/2007 |
| JP | 2008-146149 A | 6/2008 |
| JP | 2009-157913 A | 7/2009 |
| JP | 2010-057128 A | 3/2010 |
| JP | 2010-182103 A | 8/2010 |
| WO | 2012/018387 A1 | 8/2012 |

OTHER PUBLICATIONS

International Search Report of PCT/JP2015/069690, dated Sep. 9, 2015.

Japanese Decision grant for Patent Application No. 2016-539346 dated Aug. 2, 2016.

\* cited by examiner

NETWORK SYSTEM, TIME MASTER STATION, AND TIME SLAVE STATION

CROSS REFERENCE TO RELATED APPLICATIONS

This application is a National Stage of International Application No. PCT/JP2015/069690 filed Jul. 8, 2015, the contents of all of which are incorporated herein by reference.

FIELD

The present invention relates to a network system including a time master station and a plurality of time slave stations, a time master station, and a time slave station.

BACKGROUND

A time master station and a plurality of time slave stations which are connected to a network include a clock, respectively. It is necessary to synchronize the times counted by the respective clocks. Therefore, techniques to synchronize the times have been proposed as disclosed in Patent Literatures 1 to 5. When respective units in the network system including the time master station and the time slave stations are synchronized with each other, not only cooperative-operation command information that indicates the start of cooperative operation, but also cooperative-operation time information that indicates a cooperative-operation time are provided to each of the units. Therefore, improvement in the reliability of the network system can be achieved. Further, there is a demand for a technique to provide correct cooperative-operation time information even when synchronization jitter causes a synchronization error between a time counted by the clock of the time master station and a time counted by the clock of the time slave station, and thus improve the reliability of the network system.

CITATION LIST

Patent Literatures

Patent Literature 1: International Application Publication No. WO2012/108387
Patent Literature 2: Japanese Patent Application Laid-Open Publication No. 2003-271208
Patent Literature 3: Japanese Patent Application Laid-Open Publication No. 2010-057128
Patent Literature 4: Japanese Patent Application Laid-Open Publication No. 2007-184687
Patent Literature 5: Japanese Patent Application Laid-Open Publication No. 2009-157913

SUMMARY

Technical Problem

In order to improve the reliability of the network system, the following problems need to be solved. The reliability of a network system refers to the reliability of a cooperative operation in a synchronous network system including synchronization-target devices and external devices, and means a continuous cooperative operation of the synchronous network system.

The first problem is to establish a cooperative-operation-time information transmission unit that takes into account a time synchronization error that is an advance or a delay in a time counted by a time slave station relative to the time counted by a time master station. In the conventional technique, the cooperative-operation-time information transmission unit has not been taken into account. In a case where clock correction between the time master station and the time slave station is performed with high accuracy, and the cooperative-operation time information is not transmitted across cooperative-operation cycles for performing a cooperative operation at a given interval, it suffices that the time slave station recognizes a cooperative-operation time on the basis of the information transmitted from the time master station. However, in an actual synchronous network system, due to synchronization jitter that is variations in a synchronization timing, the time counted by the time slave station may have an advanced or delayed relation with the time counted by the time master station. When the cooperative-operation time is transmitted to the time slave station, this time slave station needs to recognize the cooperative-operation time, taking account of whether the time counted by the time slave station is advanced or delayed relative to the time counted by the time master station.

The causes of the synchronization jitter include, for example, (1) the difference in the clock-counter operating speed due to a frequency deviation between oscillation elements used respectively in a synchronous master device, a time master station, and time slave stations; (2) the variations in a synchronization-signal input timing, which occur when a synchronization signal propagates from the synchronous master device (an external device) to the time master station through an external path; and (3) the variations in a frame arrival timing, which occur when a synchronization frame and a propagation-delay measurement frame propagate from the time master station to the time slave stations through a network path.

The second problem is to establish a cooperative-operation-time information or cooperative-operation-command information transmission unit that takes into account the influence of noise etc. In the conventional technique, the cooperative-operation-time information or cooperative-operation-command information transmission unit that takes into account the influence of noise etc. caused on a transmission path within a network has not yet been established. Therefore, when the cooperative-operation time information or cooperative-operation command information is not transmitted, the cooperative operation cannot be performed. Accordingly, there is a problem in the reliability of the synchronous network system, including a continuous cooperative operation.

The third problem is to avoid complicating the design of the synchronous network system. In solving the first and second problems described above, a mechanism is needed which does not complicate the design of the synchronous network system. The complication in the design of the synchronous network system includes diversification of settings or information required for the system operation, and limitations on an information transmission timing such as a frame transmission and reception timing.

The present invention has been achieved to solve the above problems, and an object of the present invention is to provide a network system that includes a time master station and a plurality of time slave stations, and that can improve the reliability of the network system.

Solution to Problem

To solve the above problem and the object, the present invention includes: a synchronous master device to output a cooperative-operation timing signal in a cooperative-operation cycle; a time master station connected to a network; and a time slave station connected to the network, wherein the time master station includes a master clock to count a time, a master input unit to which the cooperative-operation timing signal output from the synchronous master device is input, a master generation unit to generate, on a basis of the cooperative-operation timing signal input to the master input unit and the time counted by the master clock, master cooperative-operation-time information that is information for generating slave cooperative-operation-time information indicating a reference time for operating a plurality of external devices in a cooperative manner, and a master transmission unit to transmit the master cooperative-operation-time information generated by the master generation unit, and the time slave station includes a slave clock to count a time, a slave reception unit to receive the master cooperative-operation-time information transmitted from the master transmission unit, a slave generation unit to generate the slave cooperative-operation-time information on a basis of the master cooperative-operation-time information received by the slave reception unit, the time counted by the slave clock, and the cooperative-operation cycle, and a slave output unit to output the synchronization command signal to the external device on a basis of the slave cooperative-operation-time information generated by the slave generation unit.

Advantageous Effects of Invention

According to the present invention, an effect that it is possible to improve the reliability of a network system including a time master station and a plurality of time slave stations is obtained.

DESCRIPTION OF EMBODIMENT

An embodiment of a control system according to the present invention will be explained below with reference to the drawings. The present invention is not limited to the embodiment.

First Embodiment

Figure 1:
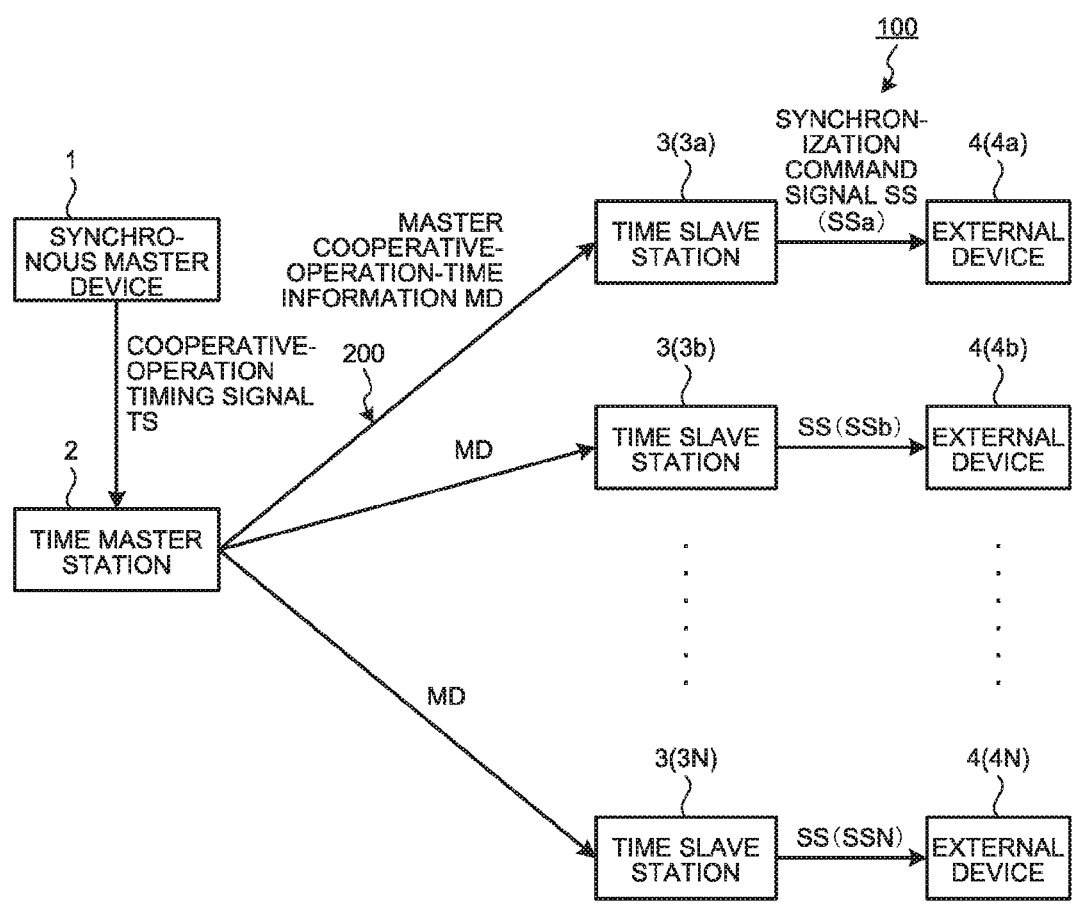
FIG. 1 is a diagram illustrating a network system according to a first embodiment.

FIG. 1 is a diagram illustrating a network system 100 according to a first embodiment. As illustrated in FIG. 1, the network system 100 includes a synchronous master device 1 that outputs a cooperative-operation timing signal TS in a cooperative-operation cycle CY, a time master station 2 connected to a network 200, and a plurality of time slave stations 3 (3a, 3b, . . . , 3N) connected to the network 200. External devices 4 (4a, 4b, . . . , 4N) are connected to the time slave stations 3, respectively. One of the plural units connected to the network 200 is designated as the time master station 2, and the other units are designated as the time slave stations 3. The unit includes a programmable controller. Each of the time master station 2 and the time slave stations 3 includes a microprocessor such as a CPU (Central Processing Unit), and a memory such as a ROM (Read Only Memory) or a RAM (Random Access Memory).

Figure 2:
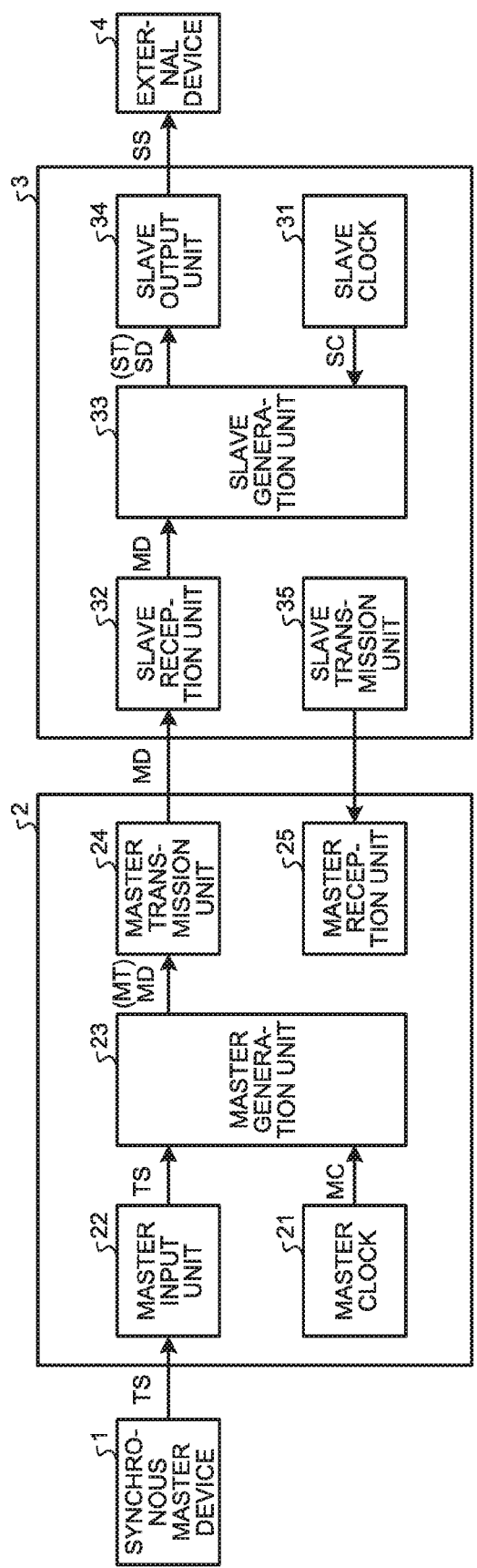
FIG. 2 is a block diagram illustrating a time master station and a time slave station according to the first embodiment.

FIG. 2 is a block diagram illustrating the time master station 2 and the time slave station 3. As illustrated in FIG. 2, the time master station 2 includes a master clock 21 that counts a time MC, a master input unit 22 to which the cooperative-operation timing signal TS output from the synchronous master device 1 is input, a master generation unit 23 that generates master cooperative-operation-time information MD that is information for generating slave cooperative-operation-time information SD, on the basis of the cooperative-operation timing signal TS input to the master input unit 22 and the time MC counted by the master clock 21, a master transmission unit 24 that transmits the master cooperative-operation-time information MD generated by the master generation unit 23, and a master reception unit 25.

The time slave station 3 includes a slave clock 31 that counts a time SC, a slave reception unit 32 that receives the master cooperative-operation-time information MD transmitted from the master transmission unit 24, a slave generation unit 33 that generates the slave cooperative-operation-time information SD that indicates a reference time to output a synchronization command signal SS for operating a plurality of the external devices 4 in a cooperative manner, on the basis of the master cooperative-operation-time information MD received by the slave reception unit 32 and the time SC counted by the slave clock 31, a slave output unit 34 that outputs the synchronization command signal SS to the external device 4 on the basis of the slave cooperative-operation-time information SD generated by the slave generation unit 33, and a slave transmission unit 35.

The time MC counted by the master clock 21, and the times SC counted by a plurality of the slave clocks 31, are synchronized with accuracy including an allowable error for a synchronization-target application.

The synchronous master device 1 outputs to the time master station 2 the cooperative-operation timing signal TS for operating the external devices 4 in the cooperative manner. The synchronous master device 1 outputs the cooperative-operation timing signal TS in the cooperative-operation cycle CY. The cooperative-operation cycle CY is a cycle to cause the external devices 4 to operate in the cooperative manner. For example, the cooperative-operation cycle CY is five seconds. An error between a timing at which the cooperative-operation timing signal TS is output from the synchronous master device 1, and a target timing is so small that the synchronous master device 1 can output the cooperative-operation timing signal TS per cooperative-operation cycle CY with high accuracy.

On the basis of the cooperative-operation timing signal TS from the synchronous master device 1, the master generation unit 23 generates the master cooperative-operation-time information MD that indicates a time MT for operating the external devices 4 in the cooperative manner. The time MT indicated by the master cooperative-operation-time information MD is a reference time for operating the external devices 4 in the cooperative manner.

Further, the master generation unit 23 can generate the master cooperative-operation-time information MD on the basis of the time MC counted by the master clock 21. The master generation unit 23 can generate the master cooperative-operation-time information MD in the cooperative-operation cycle CY. Furthermore, when the master generation unit 23 determines that the cooperative-operation timing signal TS is not input to the master input unit 22, the master generation unit 23 can generate the master cooperative-operation-time information MD on the basis of a predetermined cooperative-operation cycle CY and the time MC counted by the master clock 21.

The master cooperative-operation-time information MD generated by the master generation unit 23 is transmitted to each of the time slave stations 3 by the master transmission unit 24. The master transmission unit 24 broadcasts or multicasts the master cooperative-operation-time information MD generated by the master generation unit 23, to the time slave stations 3 in the cooperative-operation cycle CY.

Further, the master transmission unit 24 can transmit identical master cooperative-operation-time information MD successively a predetermined number of times.

On the basis of the master cooperative-operation-time information MD from the time master station 2, the slave generation unit 33 generates the slave cooperative-operation-time information SD that indicates a time ST for operating the external devices 4 connected respectively to the time slave stations 3, in the cooperative manner. The time ST indicated by the slave cooperative-operation-time information SD is the individually instructed time for operating the external device 4 connected to the time slave station 3, in the cooperative manner. For example, the time slave station 3a generates slave cooperative-operation-time information SDa for operating the external device 4a connected to the time slave station 3a, in the cooperative manner. The time slave station 3N generates slave cooperative-operation-time information SDN for operating the external device 4N connected to the time slave station 3N, in the cooperative manner. The slave generation unit 33 generates the slave cooperative-operation-time information SD on the basis of the time SC counted by the slave clock 31 and the cooperative-operation cycle CY. The slave output unit 34 outputs the synchronization command signal SS to the external device 4 connected to the time slave station 3, on the basis of the slave cooperative-operation-time information SD generated by the slave generation unit 33. For example, on the basis of the slave cooperative-operation-time information SDa, the time slave station 3a outputs a synchronization command signal SSa to the external device 4a. On the basis of the slave cooperative-operation-time information SDN, the time slave station 3N outputs a synchronization command signal SSN to the external device 4N.

On the basis of the master cooperative-operation-time information MD received by the slave reception unit 32, the cooperative-operation cycle CY and the next slave cooperative-operation time ST1, the slave generation unit 33 determines whether the time SC counted by the slave clock 31 is advanced relative to the time MC counted by the master clock 21. On the basis of the determination result, the slave generation unit 33 can generate the slave cooperative-operation-time information SD.

Further, when the slave generation unit 33 determines that the master cooperative-operation-time information MD is not received in the slave reception unit 32, the slave generation unit 33 can generate the slave cooperative-operation-time information SD on the basis of a predetermined cooperative-operation cycle CY and the time SC counted by the slave clock 31.

Furthermore, the slave generation unit 33 determines whether the master cooperative-operation-time information MD has been received within a specific cooperative-operation cycle CY, and on the basis of a determination result, can correct the slave cooperative-operation-time information SD.

The slave reception unit 32 can receive identical master cooperative-operation-time information MD a plurality of times. The slave reception unit 32 can also receive the master cooperative-operation-time information MD at any timing.

As an example, in a case of obtaining inputs from a plurality of sensors in synchronization with a pulse signal from an arbitrary sampling-frequency counter, the external devices 4 correspond to the sensors. The cooperative-operation cycle CY is a cycle to cause the plural sensors to operate in the cooperative manner, and corresponds to a sampling cycle. The cooperative-operation timing signal TS corresponds to a pulse signal that is output in an arbitrary sampling cycle. The master cooperative-operation-time information MD and the slave cooperative-operation-time information SD indicate a reference timing at which an input-obtaining command signal is output to the plural sensors.

Next, an operation of the network system 100 is described with reference to flowcharts in FIGS. 3 and 4, and schematic diagrams in FIGS. 5 to 7.

In the following descriptions, the time MC counted by the master clock 21 is referred to as "master time MC" where appropriate, and the time SC counted by the slave clock 31 is referred to as "slave time SC" where appropriate. Further, the time MT indicated by the master cooperative-operation-time information MD generated by the master generation unit 23 is referred to as "master cooperative-operation time MT" where appropriate. The time ST indicated by the slave cooperative-operation-time information SD generated by the slave generation unit 33 is referred to as "slave cooperative-operation time ST" where appropriate.

Figure 3:
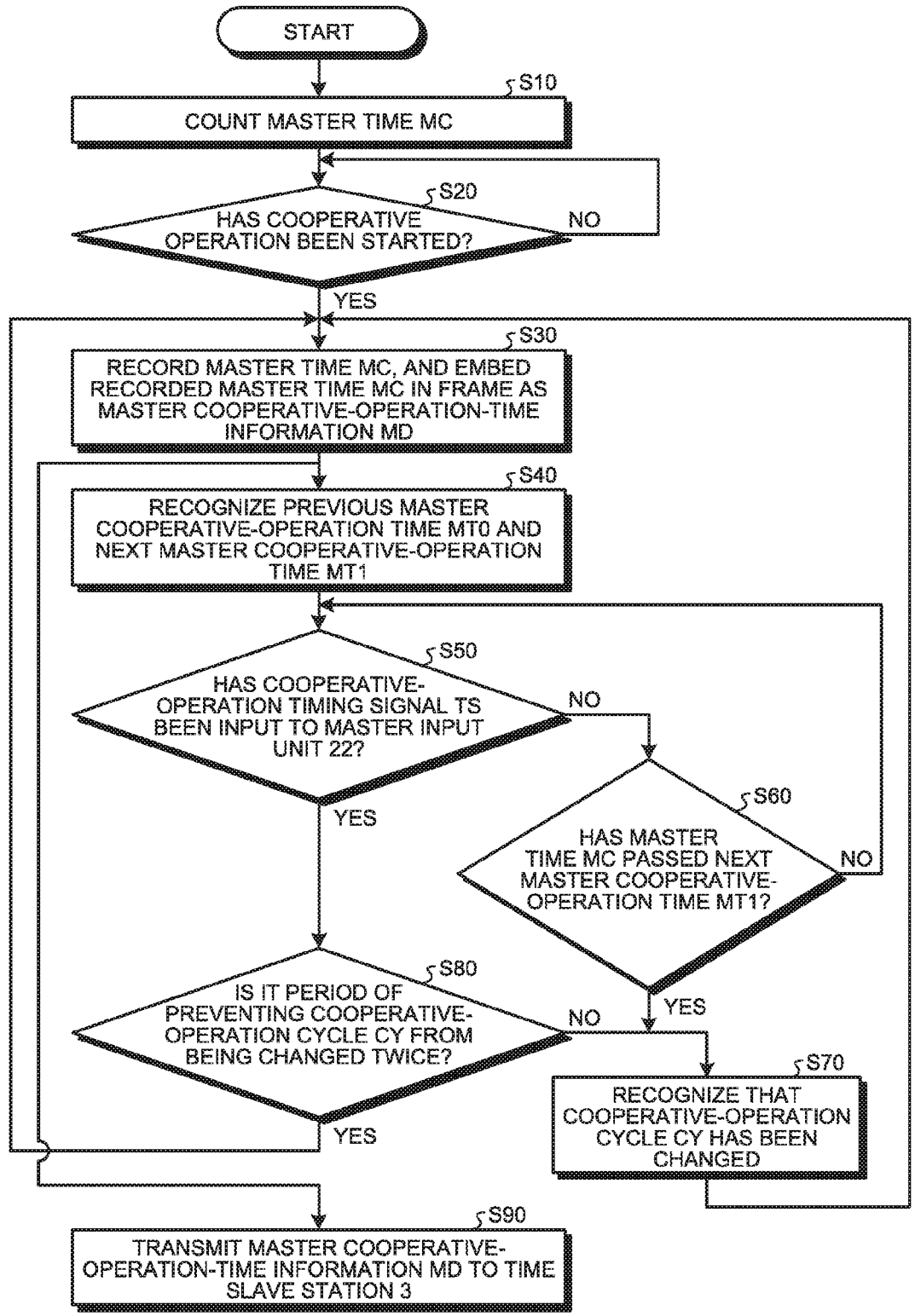
FIG. 3 is a flowchart of an operation of the network system according to the first embodiment.
Figure 4:
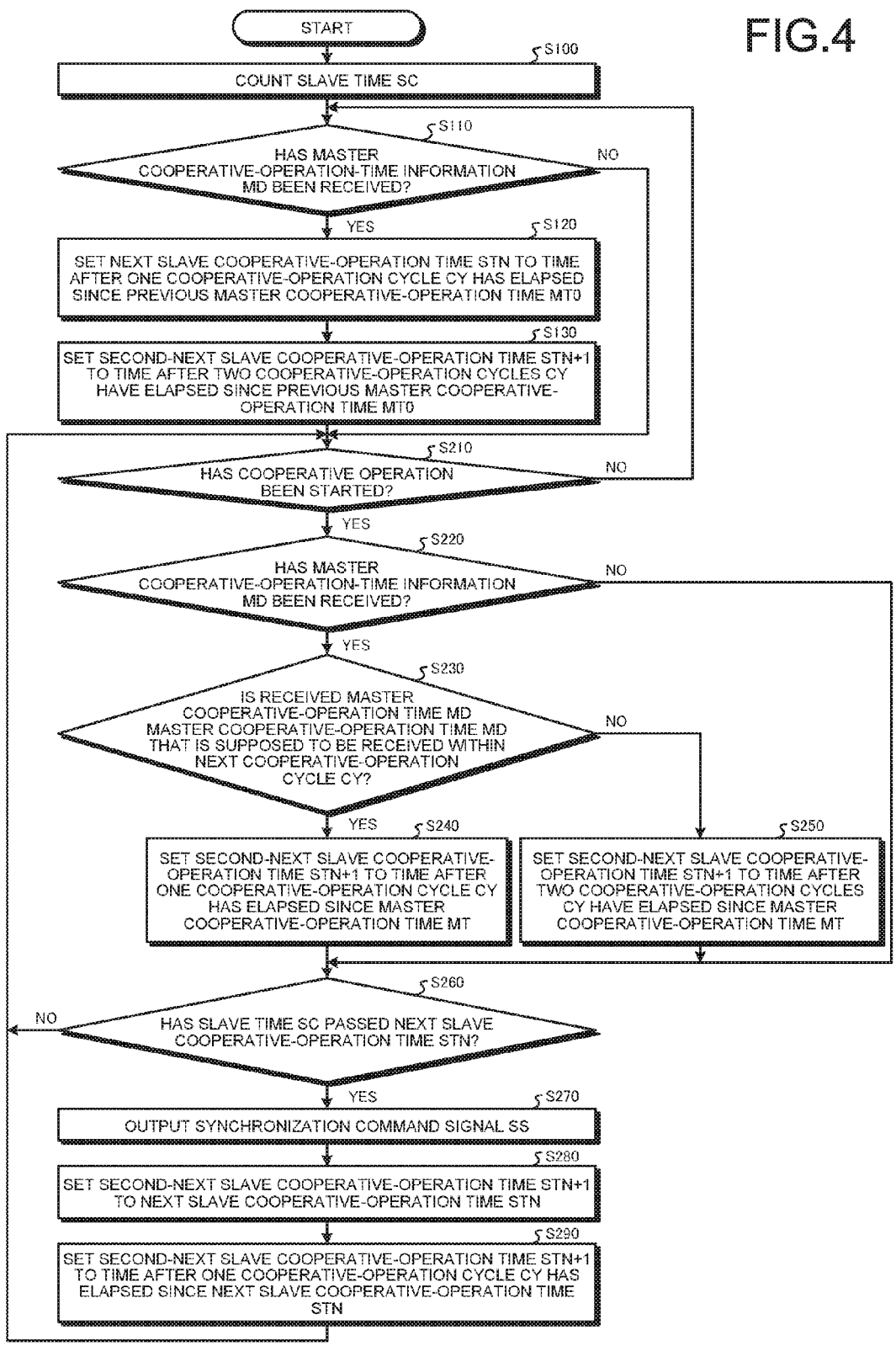
FIG. 4 is a flowchart of an operation of the network system according to the first embodiment.

First, with reference to FIG. 3, an operation of the time master station 2 is described. The master clock 21 counts the master time MC (Step S10). After counting of the master time MC is started, the time master station 2 determines whether a cooperative operation has been started (Step S20). When the cooperative-operation timing signal TS from the synchronous master device 1 is input to the master input unit 22, the cooperative operation is started. At Step S20, when it is determined that the cooperative operation is not started (NO at Step S20), the time master station 2 waits for the start of the cooperative operation (YES at Step S20).

At Step S20, when the cooperative-operation timing signal TS is input, and it is determined that the cooperative operation has been started (YES at Step S20), the master generation unit 23 generates the master cooperative-operation-time information MD on the basis of the input cooperative-operation timing signal TS and the master time MC. The master generation unit 23 defines the master time MC, counted at a point in time when the cooperative-operation timing signal TS is input to the master input unit 22, as a previous master cooperative-operation time MT0. The master generation unit 23 records the master time MC counted at the point in time when the cooperative-operation timing signal TS is input, and embeds the recorded master time MC in a frame as the master cooperative-operation-time information MD (Step S30).

The cooperative-operation timing signal TS is input to the master input unit 22 in the cooperative-operation cycle CY. The master cooperative-operation-time information MD is generated in the cooperative-operation cycle CY. The master generation unit 23 recognizes the previous master cooperative-operation time MT0 and a next master cooperative-operation time MT1 (Step S40). The next master cooperative-operation time MT1 refers to a time after one cooperative-operation cycle CY has elapsed since the previous master cooperative-operation time MT0. For example, in a case where the cooperative-operation timing signal TS is input at 12:00:00, twelve o'clock and the cooperative-operation cycle CY is five seconds, "12:00:00" is embedded in a master cooperative-operation-time information frame, and the next master cooperative-operation time MT1 is recognized as "12:00:05".

The master generation unit 23 determines whether the next cooperative-operation timing signal TS has been input to the master input unit 22 (Step S50). In a case where the cooperative-operation timing signal TS is normally transmitted from the synchronous master device 1 to the time master station 2 in the cooperative-operation cycle CY, the next cooperative-operation timing signal TS is input to the master input unit 22 after one cooperative-operation cycle CY (five seconds) has elapsed since a point in time when the previous cooperative-operation timing signal TS was input to the master input unit 22.

At Step S50, when it is determined that the cooperative-operation timing signal TS is not input (NO at Step S50), the master generation unit 23 determines whether the master time MC has passed the next master cooperative-operation time MT1 (Step S60).

At Step S60, when it is determined that the master time MC has passed the next master cooperative-operation time MT1 (YES at Step S60), the master generation unit 23 recognizes that the cooperative-operation cycle CY has been changed (Step S70). The master generation unit 23 proceeds to the process at Step S30.

At Step S60, when it is determined that the master time MC does not pass the next master cooperative-operation time MT1 (NO at Step S60), the master generation unit 23 proceeds to the process at Step S50.

At Step S50, when it is determined that the cooperative-operation timing signal TS has been input (YES at Step S50), the master generation unit 23 determines whether it is a period to prevent the cooperative-operation cycle CY from being changed twice (Step S80).

The period to prevent the cooperative-operation cycle CY from being changed twice is a period to preventing the cooperative-operation cycle CY from being erroneously recognized as having been changed again at Step S50 immediately after the cooperative-operation cycle CY was changed during an arbitrary period. A difference in the occurrence timings between Step S60 and Step S50 depends on synchronization accuracy between the synchronous master device 1 and the time master station 2. On the basis of the synchronization accuracy between the synchronous master device 1 and the time master station 2, the period to prevent the cooperative-operation cycle CY from being changed twice is set.

At Step S80, when it is determined to be a period to prevent the cooperative-operation cycle CY from being changed twice (YES at Step S80), the master generation unit 23 returns to the process at Step S30. When it is determined not to be a period to prevent the cooperative-operation cycle CY from being changed twice (NO at Step S80), the master generation unit 23 proceeds to the process at Step S70.

The master transmission unit 24 transmits the master cooperative-operation-time information MD generated at Step S30 to the time slave station 3 (Step S90).

The master transmission unit 24 can transmit a frame including the master cooperative-operation-time information MD to the time slave station 3 at an arbitrary timing.

Next, an operation of the time slave station 3 is described with reference to FIG. 4. Steps S100 to S130 in FIG. 4 represent operations of the time slave station 3 before the start of cooperative operation. Steps S210 to S290 represent operations of the time slave station 3 after the start of cooperative operation. In the descriptions made with reference to FIG. 4, the next slave cooperative-operation time ST1 is referred to as "next slave cooperative-operation time STN" where appropriate, and a slave cooperative-operation time ST2 after the next is referred to as "second slave cooperative-operation time STN+1" where appropriate.

The slave clock 31 counts the slave time SC (Step S100). The slave time SC is synchronized with the master time MC. In a state in which the slave time SC is counted, the slave generation unit 33 determines whether the slave reception unit 32 has received the master cooperative-operation-time information MD (Step S110). At Step S110, when it is determined that the slave reception unit 32 does not receive the master cooperative-operation-time information MD (NO at Step S110), the slave generation unit 33 proceeds to the process at Step S210.

At Step S110, when it is determined that the slave reception unit 32 has received the master cooperative-operation-time information MD (YES at Step S110), the slave generation unit 33 generates the slave cooperative-operation-time information SD on the basis of the master cooperative-operation-time information MD received by the slave reception unit 32 and the cooperative-operation cycle CY.

The slave generation unit 33 sets the next slave cooperative-operation time STN to a time after one cooperative-operation cycle CY has elapsed since the previous master cooperative-operation time MT0 (Step S120). For example, when the previous master cooperative-operation time MT0 is "12:00:00" and the cooperative-operation cycle CY is five seconds, then the next slave cooperative-operation time STN is set to "12:00:05".

The slave generation unit 33 sets the second slave cooperative-operation time STN+1 to a time after two cooperative-operation cycles CY have elapsed since the previous master cooperative-operation time MT0 (Step S130). For example, in a case where the previous master cooperative-operation time MT0 is "12:00:00", one cooperative-operation cycle CY is five seconds and two cooperative-operation cycles CY are 10 seconds, the second slave cooperative-operation time STN+1 is set to "12:00:10".

That is, before the start of cooperative operation, each time the time slave station 3 receives the master cooperative-operation-time information MD from the time master station 2, the time slave station 3 sets the next slave cooperative-operation time STN to a time "after a lapse of one cooperative-operation cycle since the previous master cooperative-operation time MT0". Also, the time slave station 3 sets the second slave cooperative-operation time STN+1 to a time "after a lapse of two cooperative-operation cycles since the previous master cooperative-operation time MT0".

Next, an operation of the time slave station 3 after the start of cooperative operation is described. The slave clock 31 counts the slave time SC. The slave time SC is synchronized with the master time MC. In a state in which the slave time SC is counted, the time slave station 3 determines whether a cooperative operation has been started (Step S210).

At Step S210, when it is determined that the cooperative operation is not started (NO at Step S210), the time slave station 3 proceeds to the process at Step S110. At Step S210, when it is determined that the cooperative operation has been started (YES at Step S210), the slave generation unit 33 determines whether the master cooperative-operation-time information MD has been received in the slave reception unit 32 (Step S220). At Step S220, when it is determined that the master cooperative-operation-time information MD has been received (YES at Step S220), the slave generation unit 33 determines whether the received master cooperative-operation-time information MD is the master cooperative-operation-time information MD that should be received within the next cooperative-operation cycle CY (Step S230). An advance or a delay in the slave time SC relative to the master time MC is taken into account through the process at Step S230, and therefore the slave cooperative-operation-time information SD is appropriately generated.

When the following conditional expression (1) is satisfied, the slave generation unit 33 determines that the received master cooperative-operation-time information MD is the master cooperative-operation-time information MD that should be received within the next cooperative-operation cycle CY.

[received master cooperative-operation time]≤[next slave cooperative-operation time−(one cooperative-operation cycle÷2)]  (1)

The conditional expression (1) is premised on the master time MC and the slave time SC being synchronized with each other with an error of less than half of one cooperative-operation cycle CY.

At Step S230, for example, when it is determined that the slave time SC is delayed relative to the master time MC and the received master cooperative-operation-time information MD is the master cooperative-operation-time information MD that should be received within the next cooperative-operation cycle CY (YES at Step S230), then the slave generation unit 33 sets the second slave cooperative-operation time STN+1 to a time after one cooperative-operation cycle CY has elapsed since the master cooperative-operation time MT (Step S240).

At Step S230, when it is determined that the received master cooperative-operation-time information MD is not the master cooperative-operation-time information MD that should be received within the next cooperative-operation cycle CY (NO at Step S230), then the slave generation unit 33 sets the second slave cooperative-operation time STN+1 to a time after two cooperative-operation cycles CY have elapsed since the master cooperative-operation time MT (Step S250).

Next, the slave generation unit 33 determines whether the slave time SC has passed the next slave cooperative-operation time STN (Step S260). At Step S260, when it is determined that the slave time SC has passed the next slave cooperative-operation time STN (YES at Step S260), the slave generation unit 33 causes the slave output unit 34 to output the synchronization command signal SS (Step S270).

At Step S260, when it is determined that the slave time SC does not pass the next slave cooperative-operation time STN (NO at Step S260), the process at Step S210 is executed.

The slave generation unit 33 sets the second slave cooperative-operation time STN+1 to the next slave cooperative-operation time STN (Step S280).

Further, the slave generation unit 33 sets the second slave cooperative-operation time STN+1 to a time after one cooperative-operation cycle CY has elapsed since the next slave cooperative-operation time STN (Step S290). Thereafter, the processes at Steps S220 to S290 are continued.

Figure 5:
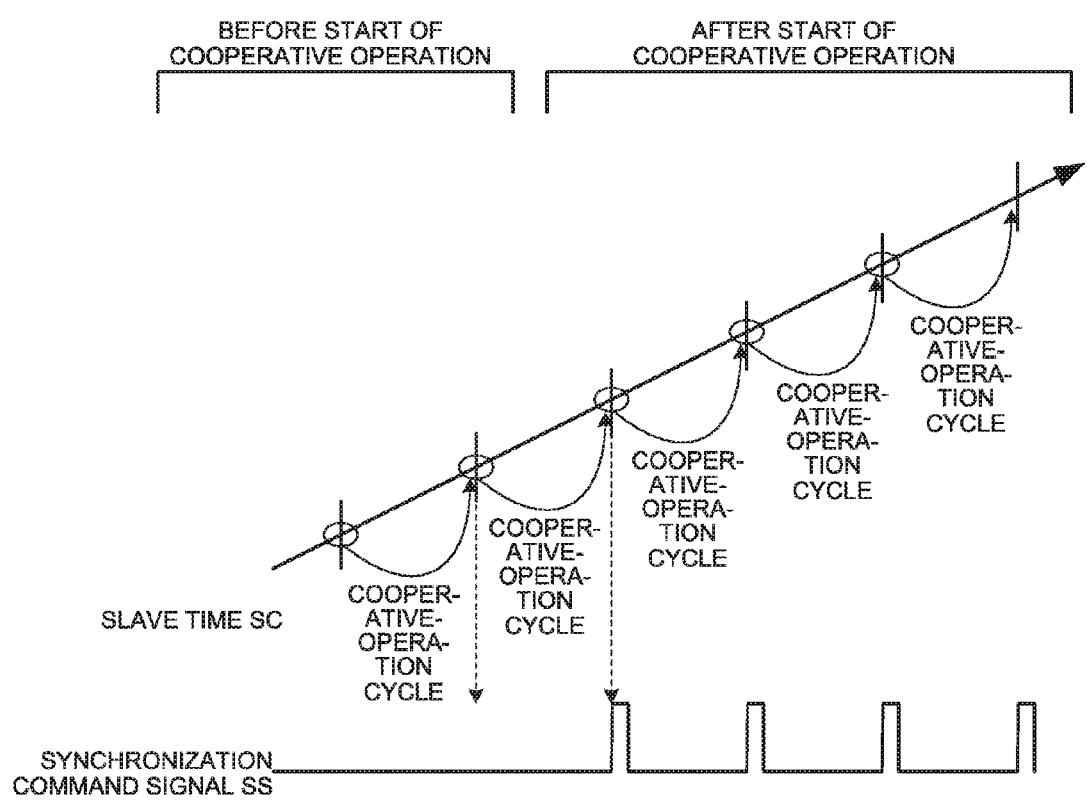
FIG. 5 is a diagram illustrating an operation of the time slave station according to the first embodiment.

FIG. 5 is a schematic diagram illustrating an example of the synchronization command signal SS to be output from the time slave station 3. As illustrated in FIG. 5, the synchronization command signal SS is not output before the start of cooperative operation, but is output after the start of cooperative operation.

Figure 6:
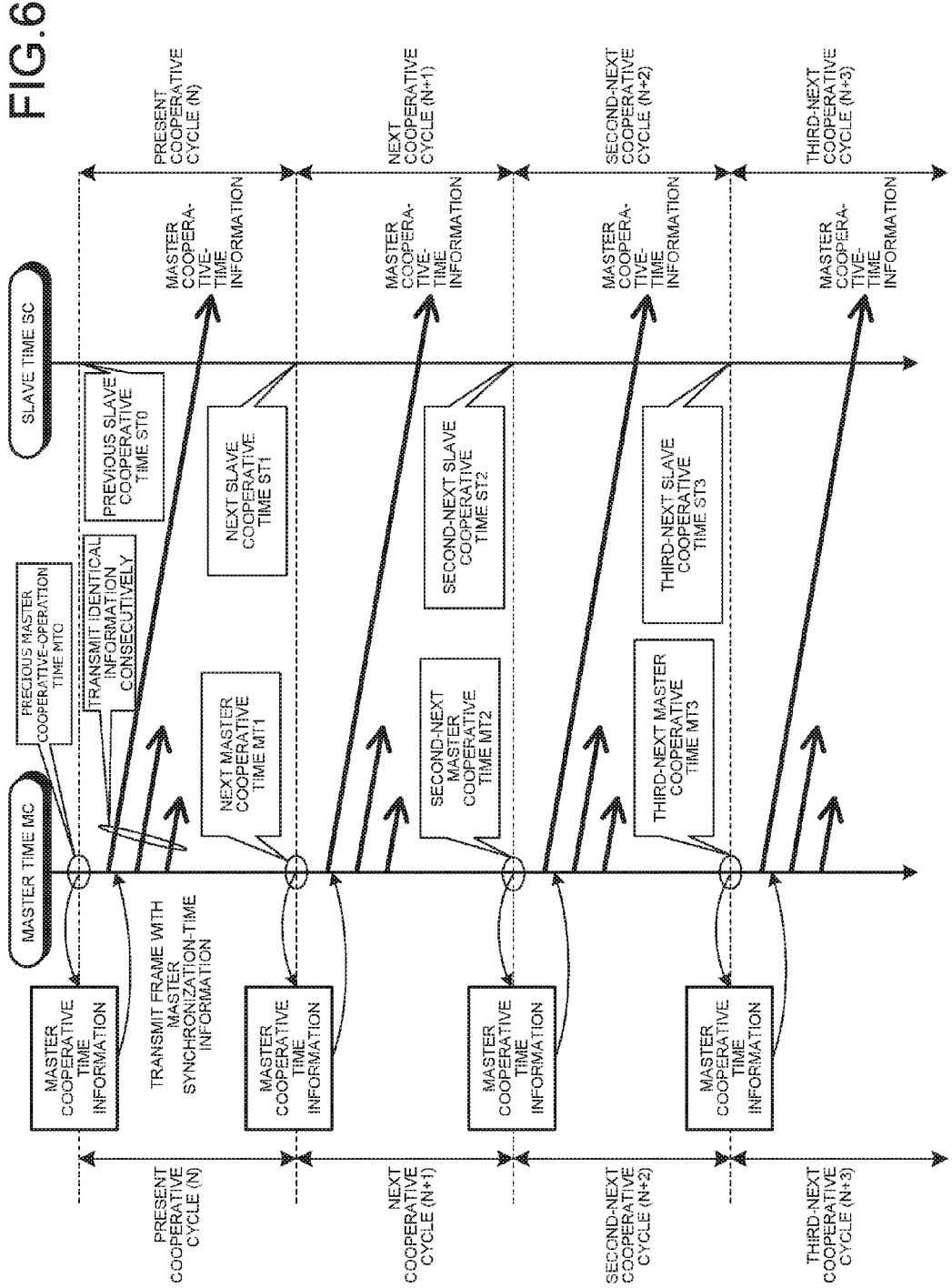
FIG. 6 is a schematic diagram illustrating an operation of the network system according to the first embodiment.

FIG. 6 is a schematic diagram illustrating a relation between the master cooperative-operation-time information MD and the cooperative-operation cycle CY in a case where a synchronization error is small between the slave time SC and the master time MC. FIG. 7 is a schematic diagram illustrating a relation between the master cooperative-operation-time information MD and the cooperative-operation cycle CY in a case where the slave time SC is delayed relative to the master time MC. In the following descriptions, the present cooperative-operation cycle CY is referred to as "present cooperative-operation cycle N" where appropriate. Further, the next cooperative-operation cycle CY is referred to as "next cooperative-operation cycle N+1" where appropriate. Furthermore, the second cooperative-operation cycle CY is referred to as "second cooperative-operation cycle N+2" where appropriate.

As illustrated in FIG. 6, in one cooperative-operation cycle CY between the previous master cooperative-operation time MT0 and the next master cooperative-operation time MT1, a plurality of pieces of the master cooperative-operation-time information MD is transmitted from the time master station 2 successively. The master cooperative-operation-time information MD to be successively transmitted in one cooperative-operation cycle CY is identical master cooperative-operation-time information MD. When the synchronization error is small between the slave time SC and the master time MC, a start-time error or finish-time error is small between the cooperative-operation cycle CY of the time master station 2 and the cooperative-operation cycle CY of the time slave station 3. Therefore, as illustrated in FIG. 6, the master cooperative-operation-time information MD successively transmitted in the present cooperative-operation cycle N of the time master station 2 is received by the slave reception unit 32 within the present cooperative-operation cycle N of the time slave station 3. Similarly, the master cooperative-operation-time information MD successively transmitted in the next cooperative-operation cycle N+1 of the time master station 2 is received by the slave reception unit 32 within the next cooperative-operation cycle N+1 of the time slave station 3. The same applies to the second cooperative-operation cycle N+2 and a third cooperative-operation cycle N+3.

Even in a case where due to the influence of noise it is difficult for the time slave station 3 to receive the master cooperative-operation-time information MD transmitted from the time master station 2, the identical master cooperative-operation-time information MD is transmitted successively. Therefore, it is highly likely that at least one of the plural pieces of the successively transmitted master cooperative-operation-time information MD is received by the time slave station 3. "Frames including the identical master cooperative-operation-time information MD" are regarded as identical frames provided that the master cooperative-operation-time information MD is identical, even if these frames include different information other than the master cooperative-operation-time information MD.

Figure 7:
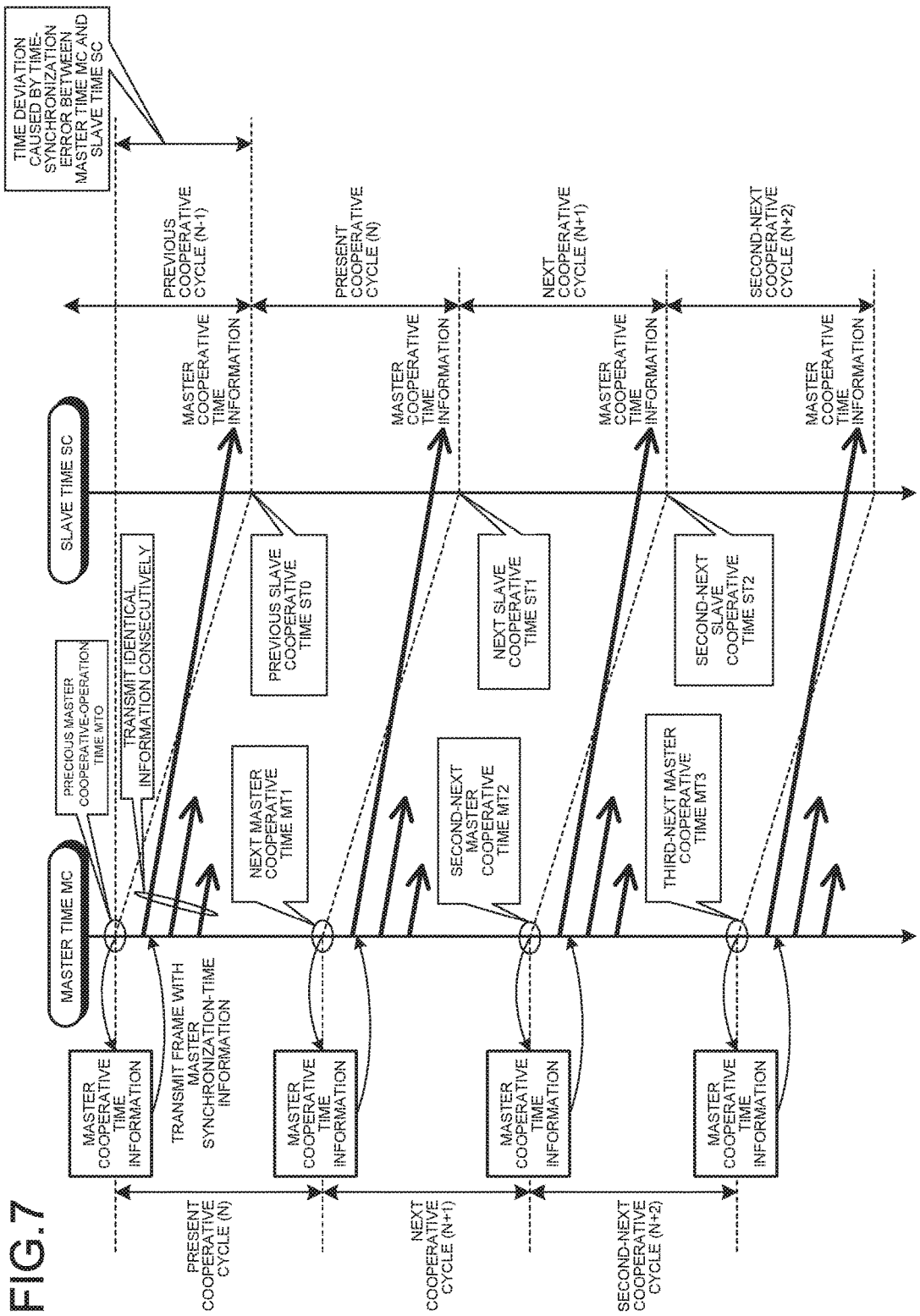
FIG. 7 is a schematic diagram illustrating an operation of the network system according to the first embodiment.

As illustrated in FIG. 7, in a case where the slave time SC is delayed relative to the master time MC, in the present cooperative-operation cycle N of the time slave station 3, the slave reception unit 32 not only receives the master cooperative-operation-time information MD transmitted in the present cooperative-operation cycle N of the time master station 2, but may also receive the master cooperative-operation-time information MD transmitted in the next cooperative-operation cycle N+1 of the time master station 2. That is, in the present cooperative-operation cycle N, the slave reception unit 32 may receive the master cooperative-operation-time information MD that should be received within the next cooperative-operation cycle N+1. If, in the present cooperative-operation cycle N, the slave reception unit 32 receives the master cooperative-operation-time information MD that should be received within the next cooperative-operation cycle N+1 and the slave generation unit 33 calculates the next slave cooperative-operation time ST1 on the basis of the master cooperative-operation-time information MD received by the slave reception unit 32, then the master cooperative-operation time MT and the slave cooperative-operation time ST cannot be synchronized with each other.

As described at Step S230, whether the slave time SC is delayed relative to the master time MC is determined on the basis of the master cooperative-operation-time information MD and the cooperative-operation cycle CY. As described at Step S240, when it is determined that the slave time SC is delayed, the second slave cooperative-operation time ST2 (STN+1) is set to a time after one cooperative-operation cycle CY has elapsed since the received master cooperative-operation time MT. Also as described at Step S250, when it is determined that the slave time SC is not delayed, the second slave cooperative-operation time ST2 (STN+1) is set to a time after two cooperative-operation cycles CY have elapsed since the received master cooperative-operation time MT. The slave reception unit 32 can receive the master cooperative-operation-time information MD any number of times at any timing within the cooperative-operation cycle CY. Each time the slave reception unit 32 receives the master cooperative-operation-time information MD, the slave generation unit 33 updates the second slave cooperative-operation time ST2. As described above, the time slave station 3 has a function of adjusting the slave cooperative-operation time ST indicated by the slave cooperative-operation-time information SD, to the correct timing. Therefore, the reliability of the network system 100 is improved.

After the start of cooperative operation, each time a frame including the master cooperative-operation-time information MD is received by the time slave station 3, the value of the second slave cooperative-operation time ST2 is updated on the basis of the condition described at Step S230. At Step S230, on the basis of the master cooperative-operation-time information MD in the time master station 2, whether the time slave station 3 has received within the present cooperative-operation cycle N a frame including the master cooperative-operation time information MD that should have been received within the next cooperative-operation cycle N+1 is confirmed. When the reception is confirmed, the update value of the second slave cooperative-operation time ST2 is decided. For example, as illustrated in FIG. 7, in the case where the slave time SC is delayed relative to the master time MC, the time slave station 3 may receive during its cooperative-operation cycle N−1 a frame including the master cooperative-operation time information MD that includes information regarding the time when the time master station 2 has reached the cooperative-operation cycle N. In this case, when the time slave station 3 calculates the next slave cooperative-operation time ST1 on the basis of the master cooperative-operation-time information MD in the time master station 2, before reaching its clock-time SC cooperative-operation time of the time slave station 3, the time slave station 3 receives a frame including the master cooperative-operation time information MD that includes information regarding the time when the time master station 2 has reached the cooperative-operation cycle N+1. Due to the repetition of this operation, the clock-counter value cannot reach the cooperative-operation time at all, and thus the time slave station 3 cannot output a cooperative-operation timing signal.

In order to prevent that case, not the next slave cooperative-operation time ST1, but the second slave cooperative-operation time ST2 is updated. At Step S230, whether the master time MC in the time master station 2 is advanced or delayed is determined, and the second slave cooperative-operation time ST2 is updated to an appropriate value. As described above, it is possible to perform the frame determination at Step S230 by comparing the counter values on the basis of the expression (1).

As described at Steps S260 and S270, the time slave station 3 has a function of outputting the synchronization command signal SS. Further, as described at Steps S280 and S290, even in a case where the second slave cooperative-operation time ST2 (STN+1) is set and the master cooperative-operation-time information MD is not received by the slave reception unit 32, the time slave station 3 generates the slave cooperative-operation-time information SD automatically. This improves the reliability of the network system 100.

As described above, the master cooperative-operation-time information MD indicating the reference master cooperative-operation time MT that is the reference for the cooperative operation of the external devices 4 is generated in the time master station 2. On the basis of the master cooperative-operation-time information MD received by the slave reception unit 32 and the slave time SC counted by the slave clock 31, the time slave station 3 generates the slave cooperative-operation-time information SD indicating the slave cooperative-operation time ST for operating the connected external devices 4 in the cooperative manner. Each of the units in the network system 100 including the time master station 2 and the time slave stations 3 provides the cooperative-operation time information that indicates a reference time for the cooperative operation. Therefore, improvement in the reliability of the network system 100 can be achieved.

Even when due to synchronization jitter an advanced or delayed relation occurs between the master time MC counted by the master clock 21 and the slave time SC counted by the slave clock 31, a correct cooperative-operation time is provided to each of the units in the network system 100. This improves the reliability of the network system 100.

The slave generation unit 33 determines whether the master cooperative-operation-time information MD that should be received within a specific cooperative-operation cycle CY has been received within the specific cooperative-operation cycle CY. On the basis of the determination result, the slave generation unit 33 corrects the slave cooperative-operation-time information SD. When it is determined that the master cooperative-operation-time information MD that should be received has been received within the specific cooperative-operation cycle CY and the slave time SC is delayed relative to the master time MC, then the second slave cooperative-operation time ST2 is set to a time after one cooperative-operation cycle CY has elapsed since the master cooperative-operation time MT received by the slave reception unit 32. When it is determined that the master cooperative-operation-time information MD that should be received has not been received within the specific cooperative-operation cycle CY and the slave time SC is not delayed relative to the master time MC, then the second-next slave cooperative-operation time ST2 is set to a time after two cooperative-operation cycles CY have elapsed since the master cooperative-operation time MT received by the slave reception unit 32. The time slave station 3 has the timing adjusting function of adjusting the slave cooperative-operation time ST indicated by the slave cooperative-operation-time information SD, to a correct timing, taking into consideration an advance or a delay in the time relative to the time master station 2. Therefore, the reliability of the network system 100 is improved. Further, by taking into account the advance or delay, limitations on a timing at which the time master station 2 transmits the master cooperative-operation-time information MD are relaxed. Therefore, the design of the network system 100 is simplified.

The master generation unit 23 has a cooperative-operation-time information automatically-generating function of generating the master cooperative-operation-time information MD on the basis of a predetermined cooperative-operation cycle CY and the master time MC counted by the master clock 21 when the master generation unit 23 determines that the cooperative-operation timing signal TS from the synchronous master device 1 is not input to the master input unit 22. Therefore, for example, even in a case where the cooperative-operation timing signal TS from the synchronous master device 1 is lost due to noise and the cooperative-operation timing signal TS cannot be transmitted to the time master station 2, the master generation unit 23 generates the master cooperative-operation-time information MD automatically, and thus notifies the time slave station 3 of the master cooperative-operation-time information MD. The cooperative operation can thus be continued. Consequently, the reliability of the network system 100 is improved.

The master transmission unit 24 has a cooperative-operation-time information successively-transmitting function of transmitting identical master cooperative-operation-time information MD successively a predetermined number of times. For example, even under the circumstances where the master cooperative-operation-time information MD to be transmitted from the time master station 2 to the time slave station 3 tends to be lost due to noise, the identical master cooperative-operation-time information MD is transmitted successively a predetermined number of times. Therefore, the probability of supplying the master cooperative-operation-time information MD to the time slave station 3 is increased, and thus the cooperative operation can be continued.

The slave reception unit 32 can receive the identical master cooperative-operation-time information MD a plurality of times. Therefore, the reliability of communication between the master transmission unit 24 and the slave reception unit 32 is improved. Further, because the slave reception unit 32 receives the identical master cooperative-operation-time information MD the plurality of times, limitations on a timing at which the time master station 2 transmits the master cooperative-operation-time information MD are relaxed. Accordingly, the design of the network system 100 is simplified.

The slave reception unit 32 has a consecutive-reception allowing function of receiving a frame including the master cooperative-operation-time information MD any number of times at any timing within the cooperative-operation cycle CY. This makes it possible to avoid complicating the system design. Furthermore, each time the slave reception unit 32 receives a frame including the master cooperative-operation-time information MD, the second slave cooperative-operation time ST2 is adjusted to a correct timing. Therefore, the next slave cooperative-operation time ST1 (the slave cooperative-operation-time information SD) is indirectly updated to a correct timing.

The timing adjusting function of adjusting the slave cooperative-operation-time information SD to a correct timing by the time slave station 3, the cooperative-operation-time information automatically-generating function of generating the master cooperative-operation-time information MD by the master generation unit 23, the cooperative-operation-time information successively-transmitting function of successively transmitting identical master cooperative-operation-time information MD a predetermined number of times by the time master station 2, and the consecutive-reception allowing function of receiving the master cooperative-operation-time information MD any number of times at any timing within the cooperative-operation cycle CY by the time slave station 3 are combined to thereby improve the reliability of the network system 100.

The slave generation unit 33 has the cooperative-operation-time information automatically-generating function of generating the slave cooperative-operation-time information SD on the basis of a predetermined cooperative-operation cycle CY and the slave time SC counted by the slave clock 31 when the slave generation unit 33 determines that the master cooperative-operation-time information MD is not received in the slave reception unit 32. Therefore, for example, even under the circumstances where the master cooperative-operation-time information MD from the time master station 2 is lost due to noise and the master cooperative-operation-time information MD is not transmitted to the time slave station 3, the slave generation unit 33 generates the slave cooperative-operation-time information SD automatically, and thus notifies the external device 4 of the synchronization command signal SS. The cooperative operation can thus be continued. Consequently, the reliability of the network system 100 is improved.

At Steps S240 and S250, the second slave cooperative-operation time ST2 (STN+1) is corrected. Therefore, even when the master cooperative-operation-time information MD that indicates the next master cooperative-operation time MT1 is received by the slave reception unit 32 before the slave time SC reaches the next slave cooperative-operation time ST1, a reduction in the reliability of the network system 100 is suppressed.

As described above, according to the first embodiment, in the network system 100 in which there is a time synchronization error indicating that the slave time SC counted by the time slave station 3 is advanced or delayed relative to the master time MC counted by the time master station 2, it is possible to transmit the correct cooperative-operation time information without complicating the design of the synchronous network system. Therefore, it is possible to perform the cooperative operation.

Further, the cooperative-operation-time information automatically-generating function in the time master station 2, the cooperative-operation-time information successively-transmitting function in the time master station 2, and the slave cooperative-operation-time information automatically-generating function in the time slave station 3 are combined to thereby enable continuous provision of the cooperative-operation timing to the connected devices even under the circumstances where the cooperative-operation time frame is lost due to noise.

Furthermore, the aforementioned first and second problems are solved without complicating the design of a synchronous network system. Therefore, it is possible to avoid complicating the design of the synchronous network system.

The configurations described in the above embodiments are only an example of the contents of the present invention. The configurations can be combined with other well-known techniques, and can be modified without departing from the scope of the invention, such as omitting a part of the configurations.

REFERENCE SIGNS LIST 1 synchronous master device
2 time master station
3 time slave station
4 external device
21 master clock
22 master input unit
23 master generation unit
24 master transmission unit
25 master reception unit
31 slave clock
32 slave reception unit
33 slave generation unit
34 slave output unit
35 slave transmission unit
100 network system
200 network

The invention claimed is:

1. A network system comprising:
a synchronous master device to output a cooperative-operation timing signal in a cooperative-operation cycle;
a time master station connected to a network; and
a time slave station connected to the network, wherein
the time master station includes:
a processor to execute a program; and
a memory to store the program which, when executed by the processor, performs processes of,
counting a first counter value,
receiving the cooperative-operation timing signal output from the synchronous master device,
generating, on a basis of the received cooperative-operation timing signal and the counted first counter value, master cooperative-operation-time information that is information for generating slave cooperative-operation-time information indicating a reference counter value for operating a plurality of external devices in a cooperative manner, and
transmitting the generated master cooperative-operation-time information, and
the time slave station includes:
a processor to execute a program; and
a memory to store the program which, when executed by the processor, performs processes of,
counting a second counter value,
receiving the transmitted master cooperative-operation-time information,
generating the slave cooperative-operation-time information on a basis of the received master cooperative-operation-time information, the counted second counter value, and the cooperative-operation cycle, and
outputting a synchronization command signal to the external device on a basis of the slave cooperative-operation-time information generated by the slave generation unit.

2. The network system according to claim 1, wherein the process of generating the slave cooperative-operation-time information comprises determining on a basis of the received master cooperative-operation-time information and the cooperative-operation cycle whether the counted second counter value is advanced relative to the counted first counter value, and generating the slave cooperative-operation-time information on a basis of a result of the determination.

3. The network system according to claim 1, wherein the process of generating the master cooperative-operation-time information further comprises, when determining that the cooperative-operation timing signal is not received generating the master cooperative-operation-time information on a basis of the cooperative-operation cycle and the counted first counter value.

4. The network system according to claim 1, wherein the process of transmitting the master cooperative-operation-time information comprises transmitting identical pieces of the master cooperative-operation-time information successively a predetermined number of times.

5. The network system according to claim 1, wherein the process of receiving the master cooperative-operation-time information comprises receiving identical pieces of the master cooperative-operation-time information a plurality of times.

6. The network system according to claim 1, wherein the process of generating the slave cooperative-operation-time information further comprises, when determining that the master cooperative-operation-time information is not received, generating the slave cooperative-operation-time information on a basis of the cooperative-operation cycle and the counted second counter value.

7. A time master station comprising:
a processor to execute a program; and
a memory to store the program which, when executed by the processor, performs processes of,
counting a counter value;
receiving a cooperative-operation timing signal output in a cooperative-operation cycle;
generating, on a basis of the received cooperative-operation timing signal and the counted counter value, master cooperative-operation-time information that indicates a reference counter value for operating a plurality of external devices in a cooperative manner; and
transmitting the generated master cooperative-operation-time information, to a time slave station, wherein
when determining that the cooperative-operation timing signal is not received, the process of generating the master cooperative-operation-time information further comprises generating the master cooperative-operation-time information on a basis of the cooperative-operation cycle and the counted counter value.

8. The time master station according to claim 7, wherein the process of transmitting the master cooperative-operation-time information comprises transmitting identical pieces of the master cooperative-operation-time information successively a predetermined number of times.

9. A time slave station comprising:
a processor to execute a program; and
a memory to store the program which, when executed by the processor, performs processes of,
counting a counter value;
receiving master cooperative-operation-time information transmitted from a time master station in a cooperative-operation cycle;

generating, on a basis of the received master cooperative-operation-time information and the counted counter value, slave cooperative-operation-time information that indicates a reference counter value for operating a plurality of external devices in a cooperative manner; and outputting a synchronization command signal to the external device on a basis of the generated slave cooperative-operation-time information, wherein when determining that the master cooperative-operation-time information is not received, the process of generating the slave cooperative-operation-time information further comprises generating the slave cooperative-operation-time information on a basis of the cooperative-operation cycle and the counted counter value counted by the slave clock.

* * * * *